(12) United States Patent
Ono

(10) Patent No.: US 10,761,677 B2
(45) Date of Patent: Sep. 1, 2020

(54) PROCESSING EXECUTING APPARATUS DISPLAYING OPERATION BUTTONS AND NON-TRANSITORY STORAGE MEDIUM STORING INSTRUCTIONS READABLE BY THE PROCESSING EXECUTING APPARATUS DISPLAYING THE SAME

(71) Applicant: BROTHER KOGYO KABUSHIKI KAISHA, Nagoya-shi, Aichi-ken (JP)

(72) Inventor: Takatoshi Ono, Yokkaichi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 241 days.

(21) Appl. No.: 15/434,388

(22) Filed: Feb. 16, 2017

(65) Prior Publication Data

US 2017/0285909 A1 Oct. 5, 2017

(30) Foreign Application Priority Data

Mar. 31, 2016 (JP) ................. 2016-071456

(51) Int. Cl.
| | |
|---|---|
| *G06F 3/0481* | (2013.01) |
| *H04L 29/08* | (2006.01) |
| *H04N 1/00* | (2006.01) |

(52) U.S. Cl.
CPC ...... *G06F 3/04812* (2013.01); *G06F 3/04817* (2013.01); *H04L 67/10* (2013.01);
(Continued)

(58) Field of Classification Search
None
See application file for complete search history.

(56) References Cited

U.S. PATENT DOCUMENTS

| 6,313,921 B1 * | 11/2001 | Kadowaki | ............. G06K 15/00 |
| | | | 358/1.1 |
| 2005/0007619 A1 * | 1/2005 | Minato | ............. H04N 1/00424 |
| | | | 358/1.14 |

(Continued)

FOREIGN PATENT DOCUMENTS

| CN | 1855981 A | 11/2006 |
| CN | 101282396 A | 10/2008 |

(Continued)

OTHER PUBLICATIONS

Ricoh, "Adminstrator Tools" (2007) available at: http://support.ricoh.com/bb_v1oi/pub_e/oi_view/0001033/0001033299/view/usertool/unv/0054.htm (Year: 2007).*

(Continued)

*Primary Examiner* — James T Tsai
(74) *Attorney, Agent, or Firm* — Scully Scott Murphy and Presser

(57) ABSTRACT

A processing executing apparatus includes: a display; a storage that stores group identifying information for identifying a first group of a plurality of groups; a communication device communicable with a server that stores user information corresponding to each of users and at least including group belonging information indicating which group each of the users belongs; and a controller. The controller executes: a first receiving processing in which the controller receives, from the server, user information including the group belonging information indicating the first group identified by the group identifying information stored in the storage; and a first display processing in which the controller controls the display to display at least one operation button for each user corresponding to the user information received in the first receiving processing. The at least one operation button is for instructing execution of at least one processing.

4 Claims, 9 Drawing Sheets

(52) U.S. Cl.
CPC ....... *H04L 67/1097* (2013.01); *H04N 1/0035* (2013.01); *H04N 1/00501* (2013.01); *H04N 2201/0094* (2013.01)

(56) References Cited

U.S. PATENT DOCUMENTS

| | | | |
|---|---|---|---|
| 2005/0057780 A1* | 3/2005 | Fujita | H04N 1/00222 358/400 |
| 2005/0195446 A1 | 9/2005 | Kasatani | |
| 2006/0232795 A1 | 10/2006 | Tsuboi et al. | |
| 2006/0248077 A1* | 11/2006 | Horikiri | G06F 17/30011 |
| 2006/0259490 A1 | 11/2006 | Horikiri et al. | |
| 2008/0267654 A1* | 10/2008 | Kawai | G03G 15/5016 399/81 |
| 2009/0077200 A1* | 3/2009 | Kumar | H04L 67/02 709/219 |
| 2009/0201557 A1 | 8/2009 | Honma | |
| 2010/0064256 A1* | 3/2010 | Esaki | H04N 1/00413 715/825 |
| 2011/0080608 A1* | 4/2011 | Do | G06F 3/04883 358/1.15 |
| 2012/0210386 A1* | 8/2012 | Kim | H04N 21/4622 725/148 |
| 2013/0290902 A1* | 10/2013 | Martin | D06F 39/005 715/823 |
| 2014/0096086 A1* | 4/2014 | Cho | G06F 3/04847 715/847 |

FOREIGN PATENT DOCUMENTS

| | | |
|---|---|---|
| JP | 2005-244411 A | 9/2005 |
| JP | 2005-244869 A | 9/2005 |
| JP | 2006-041620 A | 2/2006 |
| JP | 2006-303805 A | 11/2006 |
| JP | 2009-071727 A | 4/2009 |
| JP | 2013-031085 A | 2/2013 |
| JP | 2013-257818 A | 12/2013 |
| JP | 2015-022409 A | 2/2015 |

OTHER PUBLICATIONS

R. Jain, J. Bose and T. Arif, "Context based adaptation of application icons in mobile computing devices," 2013 Third World Congress on Information and Communication Technologies (WICT 2013), Hanoi, 2013, pp. 31-36. (Year: 2013).*
Notification of First Office Action dated Aug. 22, 2019 received in related Chinese Patent Application No. 201710083568.8 together with an English language translation.
Office Action dated Apr. 7, 2020 received in related Japanese Patent Application No. 2016-071456 together with an English language translation.

* cited by examiner

PROCESSING EXECUTING APPARATUS DISPLAYING OPERATION BUTTONS AND NON-TRANSITORY STORAGE MEDIUM STORING INSTRUCTIONS READABLE BY THE PROCESSING EXECUTING APPARATUS DISPLAYING THE SAME

CROSS REFERENCE TO RELATED APPLICATION

The present application claims priority from Japanese Patent Application No. 2016-071456, which was filed on Mar. 31, 2016, the disclosure of which is herein incorporated by reference in its entirety.

BACKGROUND

Technical Field

The following disclosure relates to a processing executing apparatus capable of executing at least one processing and a non-transitory storage medium storing a plurality of instructions readable by a computer of the processing executing apparatus.

Description of the Related Art

Many processing executing apparatuses have a shortcut function. The processing executing apparatus having the shortcut function stores shortcut information relating to a setting condition required for execution of various processings and controls a display to display an operation button related to the shortcut information, i. e., a shortcut icon. When the shortcut icon is operated, the processing executing apparatus executes a processing based on the shortcut information corresponding to the operated shortcut icon. Use of the shortcut function reduces the number of user operations. There is known a technique in which a user stores shortcut information customized for him or her into the processing executing apparatus.

SUMMARY

This technique allows the shortcut information with improved usability to be stored by the user into the processing executing apparatus, resulting in increase in convenience to the user. In the case where shortcut information is registered by a plurality of users on a processing executing apparatus used by the users, many shortcut icons are displayed on the display, making it difficult for each user to find a desired one of the shortcut icons. Accordingly, an aspect of the disclosure relates to a technique allowing a user to readily find a desired shortcut icon.

In one aspect of the disclosure, a processing executing apparatus includes: a display; a storage that stores group identifying information for identifying a first group of a plurality of groups; a communication device communicable with a server that stores user information corresponding to each of a plurality of users, the user information at least comprising group belonging information indicating which group each of the plurality of users belongs to among the plurality of groups; and a controller configured to execute: a first receiving processing in which the controller receives, from the server, user information including the group belonging information indicating the first group identified by the group identifying information stored in the storage; and a first display processing in which the controller controls the display to display at least one operation button for each user corresponding to the user information received in the first receiving processing, the at least one operation button being for instructing execution of at least one processing.

In another aspect of the disclosure, a non-transitory storage medium stores a plurality of instructions readable by a computer of a processing executing apparatus configured to execute at least one processing. The processing executing apparatus includes: a display; a storage that stores group identifying information for identifying a first group of a plurality of groups; and a communication device communicable with a server that stores user information corresponding to each of a plurality of users. The user information at least includes group belonging information indicating which group each of the plurality of users belongs to among the plurality of groups. The plurality of instructions, when executed by the computer, cause the processing executing apparatus to execute: a first receiving processing in which the processing executing apparatus receives, from the server, user information including the group belonging information indicating the first group identified by the group identifying information stored in the storage; and a first display processing in which the processing executing apparatus controls the display to display at least one operation button for each user corresponding to the user information received in the first receiving processing, the at least one operation button being for instructing execution of at least one processing.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described one embodiment by reference to the drawings.

Configuration of MFP

Figure 1:
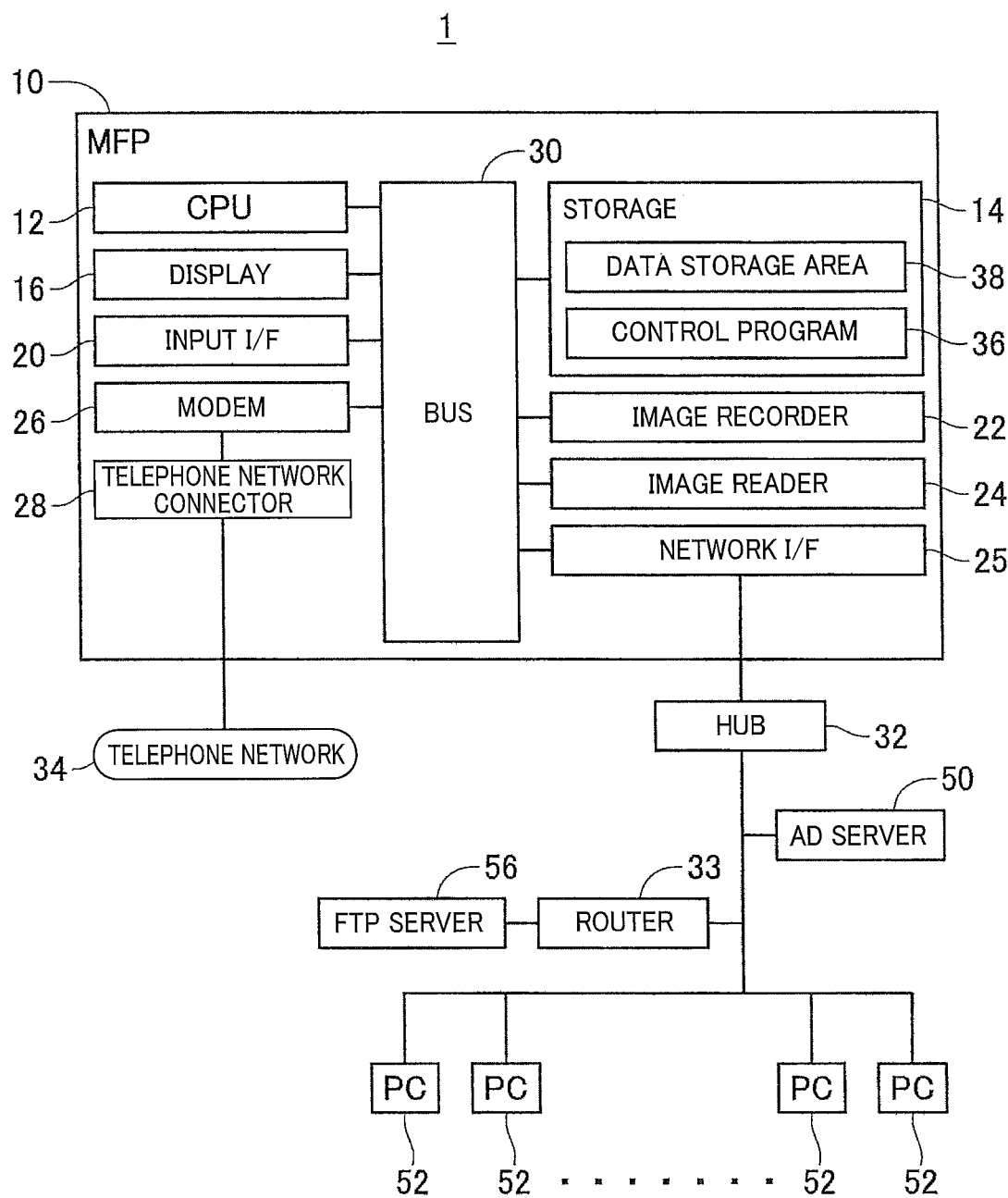
FIG. 1 is a block diagram illustrating a communication system.

FIG. 1 illustrates a communication system 1. The communication system 1 includes: a multi-function peripheral (MFP) 10 according to one embodiment of a processing executing apparatus; an Active Directory (AD) server 50 as one example of a server; a plurality of personal computers (PC) 52; and an FTP server 56.

The MFP 10 is a central processing unit (CPU) 12 as one example of a controller and a computer; a storage 14; a display 16; an input interface 20; an image recorder 22; an image reader 24; a network interface 25 as one example of a communication device; a modem 26; and a telephone network connector 28. These devices are communicable with each other via a bus 30.

The display 16 has a display surface for displaying various functions of the MFP 10. Examples of the display 16 include a liquid crystal display (LCD), an organic EL display, and a plasma display. The input interface 20 may be a touch screen integrally superposed on the display 16, for example. The input interface 20 accepts a user operation performed on images displayed on the display 16, such as icons. The input interface 20 may be hardware keys, for example.

The image recorder 22 is a printing mechanism such as an ink-jet head. The CPU 12 inputs a drive signal to the image recorder 22. In the case where the image recorder 22 is the ink-jet head, the ink-jet head ejects ink from nozzles based on the input drive signal. The image reader 24 performs scanning for reading an image and outputting a signal indicating the read image. Examples of the image reader 24 include a CCD image sensor and a contact image sensor.

The network interface 25 is connected via a hub 32 to the AD server 50 and the PCs 52 located on the network on which the MFP 10 is located. The FTP server 56 located on the Internet is connected to the hub 32 via a router 33. This configuration allows the MFP 10 to transmit and receive various kinds of data to and from the AD server 50, the PCs 52, and the FTP server 56. Also, various kinds of data can be transferred between the AD server 50 and the PCs 52.

The modem 26 converts document data into a signal transmittable to a telephone network 34 and transmits the signal to the telephone network 34 via the telephone network connector 28 using a facsimile function. The modem 26 also receives a signal from the telephone network 34 via the telephone network connector 28 to decode the signal into document data.

The CPU 12 executes processings according to a control program 36 stored in the storage 14. The control program 36 is a program for using a shortcut function on the MFP 10. Hereinafter, the CPU 12 that executes the control program 36 may be simply referred to as the name of the program. For example, words "the control program 36" may mean "the CPU 12 that executes the control program 36". The storage 14 is constituted by a combination of a random access memory (RAM), a read only memory (ROM), a flash memory, a hard disk (HDD), a buffer provided for the CPU 12, and other similar devices. The storage 14 has a data storage area 38 as one example of a storage. The data storage area 38 stores data and information required for execution of the control program 36.

Shortcut Function of MFP

The MFP 10 executes processings including a copy processing, a scan processing, and a facsimile transmission and a reception processing. For execution of such a processing, a user needs to perform a plurality of user operations to select one of the processings or to set setting conditions required for execution of the processings, for example. Use of the shortcut function reduces the number of the user operations. This MFP 10 is configured such that when shortcut information is registered by the user, the display 16 displays a shortcut icon based on the registered shortcut information. When the shortcut icon is operated, the MFP 10 executes a processing based on the shortcut information corresponding to the operated shortcut icon.

The shortcut information is required for use of the shortcut function in the various processings. The shortcut information contains information about the setting conditions required for execution of the various processings. Specifically, for example, the shortcut information relating to the scan processing contains information about a resolution and color settings for image reading and information about a destination of transmission of image data based on a read image, for example. Also, for example, the shortcut information relating to the copy processing contains information about a resolution and color settings for image printing and information about the number of printings, for example.

The shortcut information is registered by each user. Thus, the data storage area 38 stores the shortcut information and the name of the user having registered the shortcut information (hereinafter referred to as "the shortcut-registered user name") in a state in which the shortcut information and the shortcut-registered user name are associated with each other. When one of the user names is selected on a predetermined screen, the display 16 displays a shortcut icon based on the shortcut information stored in association with the selected user name. That is, when the shortcut function is used, the display 16 displays a screen for selection of one of the shortcut-registered user names (hereinafter referred to as "user selection screen") and displays a shortcut icon on the user selection screen based on the shortcut information stored in association with the selected shortcut-registered user name. This processing allows the user to use the shortcut function based on the shortcut information registered by the user.

In the case where many users use the MFP 10 and have registered the shortcut information, however, many user names appear on the user selection screen, which may make it difficult for the user to find his or her user name from among many user names. To solve this problem, the MFP 10 uses Active Directory to create and display the user selection screen.

Active Directory is a service for centralized management of hardware resources existing on a network to be managed and information on users who use the hardware resources, for example. In this communication system 1, the AD server 50 is used for Active Directory. Specifically, the AD server 50 stores information on the PC 52 (hereinafter referred to as "device information") for each of the PCs 52. In the case where the communication system 1 is used in an office, for example, information relating to the user is used as the device information, examples of which include the name of the user of the PC 52 (hereinafter referred to as "PC user name"), an employee number, an e-mail address, a department to which the user belongs, a post, and the name of a superior.

The AD server 50 stores a login flag as the device information for each of the PCs 52. The login flag indicates whether the PC 52 is in use. That is, the login flag indicates whether the PC 52 is in a logged-in state after the PC is turned on. When the login flag is ON, the login flag indicates the logged-in state. When the login flag is OFF, the login flag indicates a logged-out state. Specifically, when each of the PCs 52 is changed to the logged-in state, the PC 52 transmits information indicating the logged-in state to the AD server 50, while when the PC 52 is changed to the logged-out state, the PC 52 transmits information indicating the logged-out state to the AD server 50. Upon receiving the information indicating the logged-in state, the AD server 50 sets the login flag for the PC 52 having transmitted the information, to ON. Upon receiving the information indicating the logged-out state, the AD server 50 sets the login flag for the PC 52 having transmitted the information, to OFF. That is, the information indicating whether each of the PCs 52 is in the logged-in state is stored in the AD server 50 as the device information.

Figure 2:
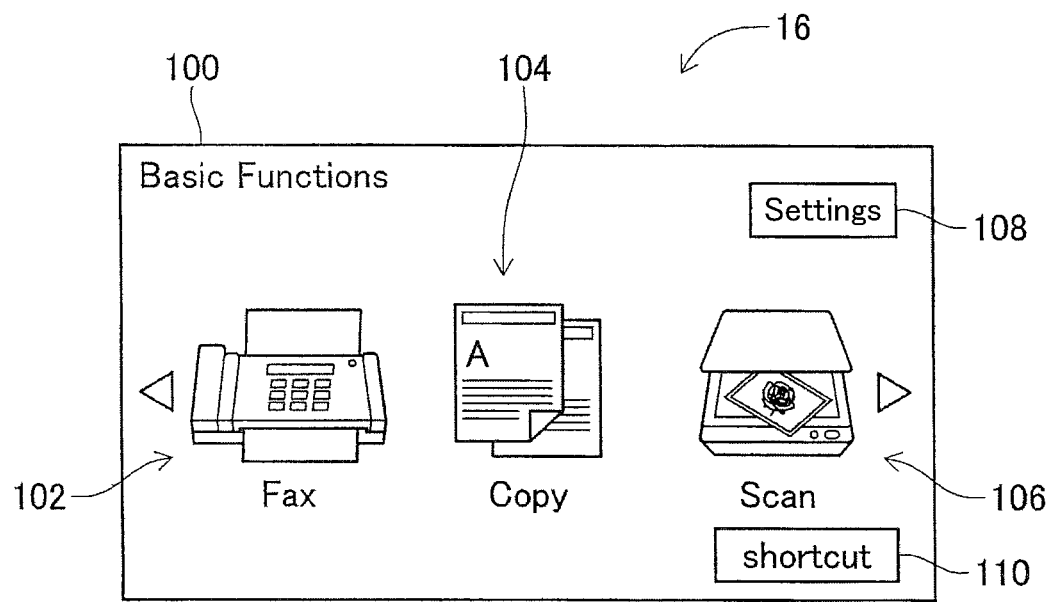
FIG. 2 is a view of a main screen.

The AD server 50 stores information on the user as the device information for each PC 52 as described above. Thus, the MFP 10 uses the device information to create and display the user selection screen. Specifically, the display 16 of the MFP 10 normally displays a main screen 100 illustrated in FIG. 2. The main screen 100 contains a Fax icon 102, a Copy icon 104, a Scan icon 106, a setting button 108, and a shortcut button 110.

When any one of the Fax icon 102, the Copy icon 104, and the Scan icon 106 is operated on the main screen 100, the display 16 displays a processing execution screen for execution of a processing corresponding to the operated icon. The processing execution screen contains: setting buttons for setting the setting conditions for execution of a processing corresponding to the processing execution screen; and an execution button for starting execution of the processing. When the setting conditions are set on the processing execution screen, an operation of the execution button causes the processing to be executed according to the set setting conditions. When the setting conditions are not set, an operation of the execution button causes the processing to be executed according to the setting conditions set in advance.

Figure 3:
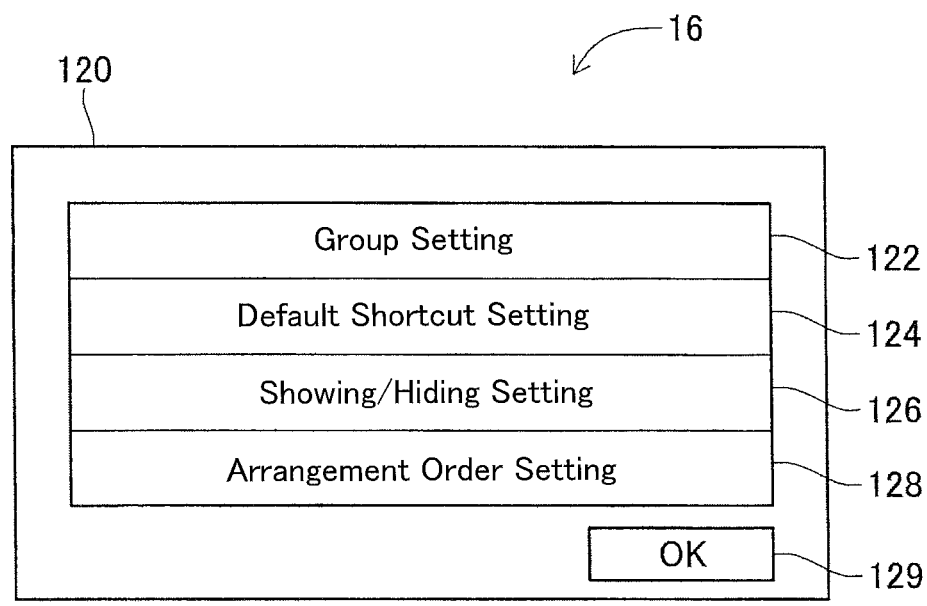
FIG. 3 is a view of a setting screen.
Figure 4:
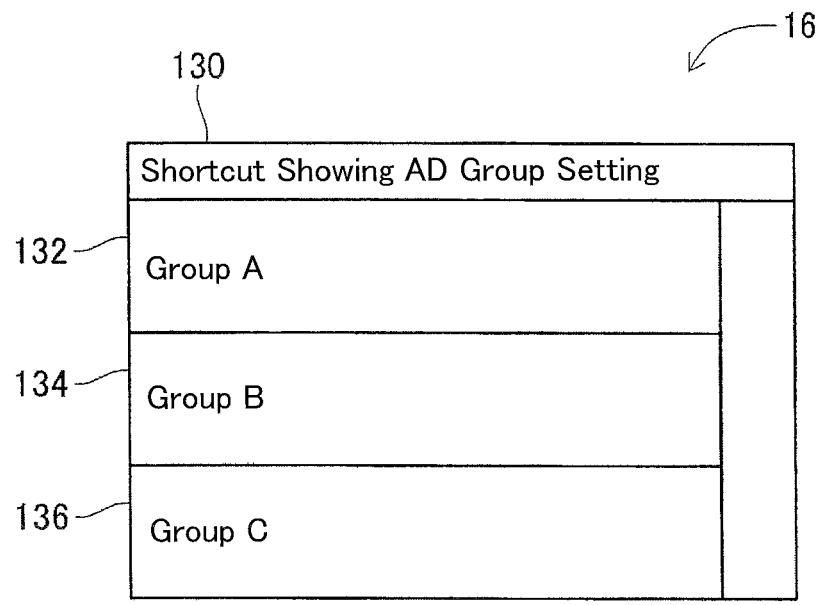
FIG. 4 is a view of a group setting screen.

When the setting button 108 is operated on the main screen 100, the display 16 displays a setting screen 120 illustrated in FIG. 3. The setting screen 120 contains a first setting button 122, a second setting button 124, a third setting button 126, a fourth setting button 128, and an OK button 129. When the first setting button 122 is operated, the display 16 displays a group setting screen 130 illustrated in FIG. 4. The group setting screen 130 contains a first selection button 132, a second selection button 134, and a third selection button 136. Each of the selection buttons 132, 134, 136 is operated to select any one of the departments contained in the device information.

Specifically, for example, in the case where three departments A-C are stored as the departments contained in the device information, the first selection button 132 is for selection of the department A, the second selection button 134 is for selection of the department B, and the third selection button 136 is for selection of the department C. When the first selection button 132 is operated, for example, the MFP 10 stores the department A into the data storage area 38 as group information. That is, the department corresponding to the operated selection button is stored into the data storage area 38 as the group information. When any one of the selection buttons is operated, the display 16 displays the setting screen 120.

When the OK button 129 is operated on the setting screen 120, the display 16 displays the main screen 100. When the shortcut button 110 is operated in the state in which the group information is stored in the data storage area 38, the MFP 10 receives all the device information from the AD server 50 and extracts the device information containing the department indicated by the stored group information, from all the device information. The device information extracted by the MFP 10 is stored into the data storage area 38 as extracted device information. The MFP 10 identifies the PC user names contained in the extracted device information. The MFP 10 extracts the user name identical to the identified PC user name from the shortcut-registered user names stored in the data storage area 38. The MFP 10 creates a group list containing: the shortcut information associated with the extracted shortcut-registered user names; and the PC user names contained in the extracted device information. The MFP 10 controls the display 16 to display an image based on the group list as the user selection screen.

Figure 5:
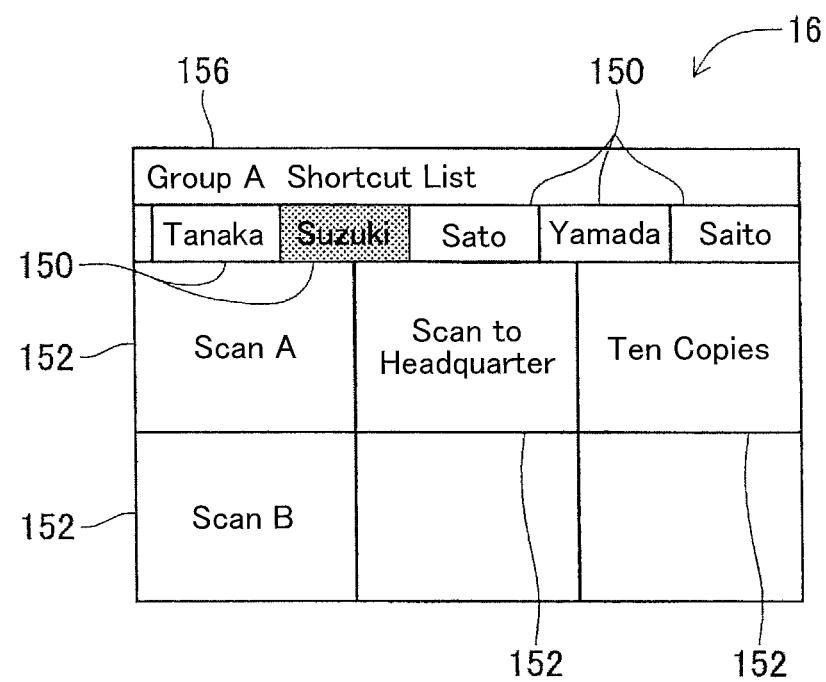
FIG. 5 is a view of a shortcut screen.

Specifically, as illustrated in FIG. 5, the PC user names contained in the extracted device information are displayed as the user names contained in the group list respectively on a plurality of header regions 150 provided on tabs arranged in the right and left direction of the display 16. When a flick operation in the right and left direction is performed on the header regions 150 provided on the respective tabs, for example, the header regions 150 provided on the respective tabs are scrolled in the right and left direction, and new header regions 150 appear on the display 16 in response to the scroll of the header regions 150. When any one of the header regions 150 provided on the respective tabs is operated on the display 16, the user name displayed on the operated header region 150 is selected.

In response to this operation, the color of the operated header region 150 is changed. FIG. 5 illustrates a screen on which the header region 150 containing the user name "Suzuki" has been operated. When one of the header regions 150 is operated, and the user name is selected, shortcut icons 152 (as one example of an operation button) based on the shortcut information associated with the selected user name are respectively displayed on tabs corresponding to the operated header region 150. That is, the user name "Suzuki" has been selected from among the plurality of user names on the screen illustrated in FIG. 5, and the display 16 displays the shortcut icons 152 corresponding to the shortcut information registered by the user name "Suzuki". The screen illustrated in FIG. 5 is a user selection screen for selection of one of the user names, but the shortcut icons 152 corresponding to the selected user name are displayed, and thus the screen illustrated in FIG. 5 will be referred to as "shortcut screen 156".

Thus, the MFP 10 uses the device information to create and display the shortcut screen 156, enabling the display 16 to display only the user names belonging to the department set on the group setting screen 130 when the user uses the shortcut function. In other words, the display 16 can display the user names for each department when the user uses the shortcut function, making it possible for the user to readily find the user name.

When creating the shortcut screen 156, the MFP 10 uses the device information stored in the AD server 50. That is, the shortcut screen 156 is created using information having been already used in Active Directory. This configuration enables the display 16 to display the user names for each department without need for the users to operate the MFP 10 to register information such as departments to which the users belong. Accordingly, it is possible to eliminate unnecessary operations and improve operability when the user uses the shortcut function.

Furthermore, the device information used in Active Directory is normally updated when the number of employee is changed due to joining, personnel shifts, and retirement, for example. Thus, the AD server 50 stores the device information created with consideration of the change of the number of employees. Accordingly, use of the device information allows the display 16 to display the shortcut screen 156 created with consideration of the change of the number of employees, without need for the user to operate the MFP 10 to add, delete, and edit registration of the users.

As described above, the shortcut screen 156 contains the user names belonging to the department set on the group setting screen 130. That is, the shortcut screen 156 cannot be created unless the user operates one of the selection buttons on the group setting screen 130 to select one of the departments. Thus, the display 16 displays not the shortcut screen 156 but the group setting screen 130 in the case where the shortcut button 110 is operated on the main screen 100 in a state in which the group information is not stored in the data storage area 38, i.e., a state in which none of the selection buttons is operated on the group setting screen 130. After one of the selection buttons is operated on the group setting screen 130 to select one of the departments, the shortcut button 110 is operated on the main screen 100, causing the display 16 to display the shortcut screen 156.

Figure 6:
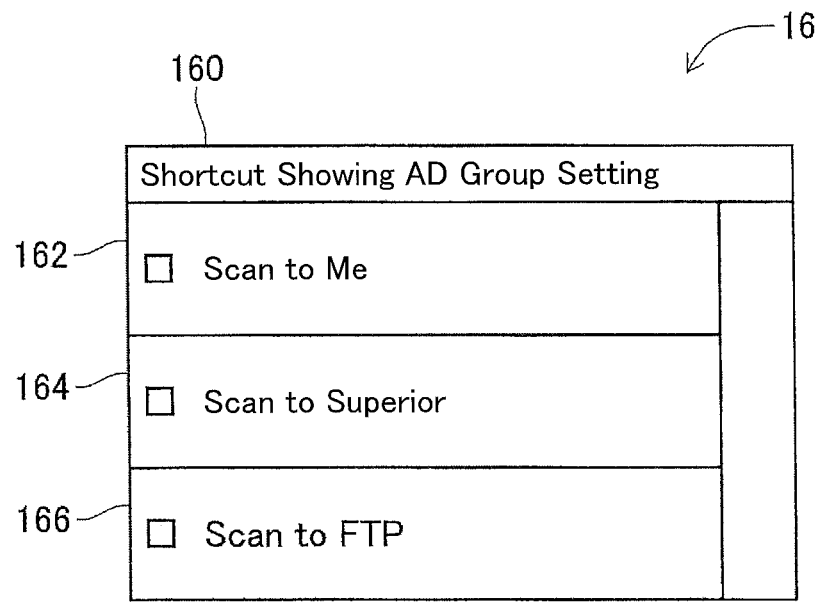
FIG. 6 is a view of a shortcut creation screen.

This MFP 10 is configured such that the shortcut information is automatically registered using the device information, without need for the user to register the shortcut information. Specifically, when the second setting button 124 is operated on the setting screen 120, the display 16 displays a shortcut creation screen 160 illustrated in FIG. 6. The shortcut creation screen 160 contains a first creation button 162, a second creation button 164, and a third creation button 166. The first creation button 162 is for creating the shortcut information for transmitting image data read and created by the image reader 24 (hereinafter referred to as "scan data"), to the e-mail address of the user. The second creation button 164 is for creating the shortcut information for transmitting the scan data to the e-mail address of the superior of the user. The third creation button 166 is for creating the shortcut information for transmitting the scan data to the FTP server 56.

When the first creation button 162 is operated on the shortcut creation screen 160, the MFP 10 identifies the e-mail address based on the extracted device information stored in the data storage area 38 when the group list is created, that is, the MFP 10 identifies the e-mail address based on the device information containing the department indicated by the group information among all the device information received from the AD server 50. The shortcut information for transmitting the scan data to the identified e-mail address is created, and this created shortcut information is registered into the group list in a state in which the shortcut information is associated with the user name identical to the PC user name contained in the extracted device information. As a result, the shortcut information for transmitting the scan data to the e-mail address of the user is created, and this shortcut information is registered into the group list in a state in which the shortcut information is associated with the user name of the user.

It is noted that when the shortcut information is created by operation on the first creation button 162, the shortcut information is created for each of the extracted device information. That is, for example, the e-mail address of Suzuki is identified based on the extracted device information containing the PC user name "Suzuki". The shortcut information for transmitting the scan data to the e-mail address of Suzuki is created, and this shortcut information is registered into the group list in a state in which the shortcut information is associated with the user name "Suzuki". Also, the e-mail address of Tanaka is identified based on the extracted device information containing the PC user name "Tanaka". The shortcut information for transmitting the scan data to the e-mail address of Tanaka is created, and this shortcut information is registered into the group list in a state in which the shortcut information is associated with the user name "Tanaka". As a result, for each of all the user names belonging to the department set on the group setting screen 130, the shortcut information for transmitting the scan data to the e-mail address of the user can be automatically registered.

When the second creation button 164 is operated on the shortcut creation screen 160, the shortcut information for transmitting the scan data to the e-mail address of the superior of the user is created, but each of the device information does not contain the e-mail address of the superior though each of the device information contains the e-mail address of the user and the name of the superior of the user. Thus, when the second creation button 164 is operated, the name of superior is identified based on the extracted device information. The device information containing the identified name of superior as the PC user name is then extracted from all the device information received from the AD server 50. The e-mail address contained in this extracted device information is the e-mail address of the identified superior. The shortcut information for transmitting the scan data to the e-mail address contained in the extracted device information is created, and this created shortcut information is registered into the group list in a state in which the shortcut information is associated with the user name identical to the PC user name contained in the extracted device information. As a result, the shortcut information for transmitting the scan data to the e-mail address of the superior of the user is created, and this shortcut information is registered into the group list in a state in which the shortcut information is associated with the user name of the user. It is noted that the shortcut information is created for each of the extracted device information also when the second creation button 164 is operated. Accordingly, for each of all the user names belonging to the department set on the group setting screen 130, the shortcut information for transmitting the scan data to the e-mail address of the superior of the user can be automatically registered.

When the third creation button 166 is operated on the shortcut creation screen 160, the shortcut information for transmitting the scan data to the FTP server 56 is created. The created shortcut information is registered so as to be associated with all the user names registered in the group list. Accordingly, for each of all the user names belonging to the department set on the group setting screen 130, the shortcut information for transmitting the scan data to the FTP server 56 can be automatically registered.

In view of the above, for example, when the first creation button 162 and the third creation button 166 are operated on the shortcut creation screen 160, the shortcut information for transmitting the scan data to the e-mail address of the user and the shortcut information for transmitting the scan data to the FTP server 56 are registered into the group list for each of all the user names belonging to the department set on the group setting screen 130. In the case where the image based on the group list is displayed on the display 16, the shortcut screen 156 illustrated in FIG. 7 is displayed on the display 16.

Figure 7:
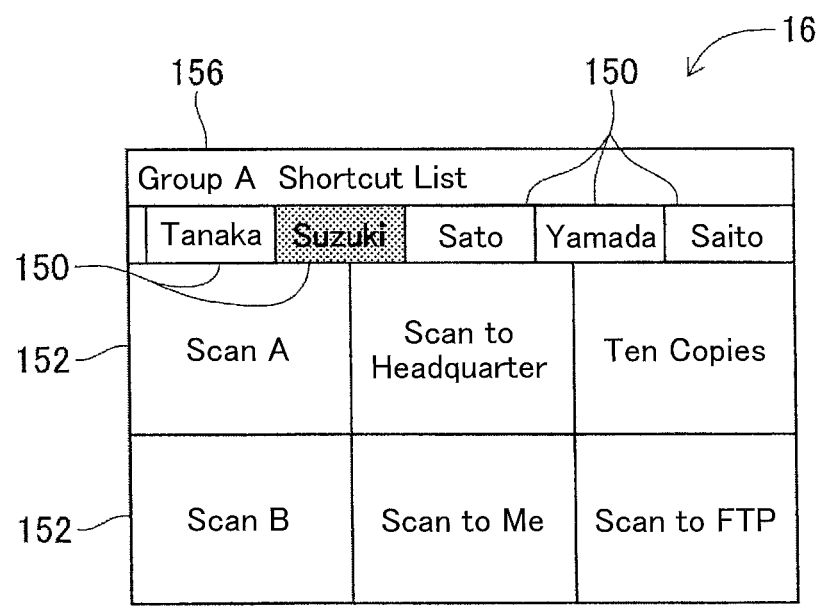
FIG. 7 is a view of the shortcut screen.

On the shortcut screen 156 illustrated in FIG. 7, as on the shortcut screen 156 illustrated in FIG. 5, the user name "Suzuki" has been selected from among the plurality of user names, and the display 16 displays the shortcut icons 152 corresponding to the shortcut information registered by the user name "Suzuki". As understood when compared with the shortcut screen 156 illustrated in FIG. 5, the display 16 additionally displays the shortcut icon 152 "Scan to Me" and the shortcut icon 152 "Scan to FTP" on the shortcut screen 156 illustrated in FIG. 7.

The shortcut icon 152 "Scan to Me" is an icon that corresponds to the shortcut information for transmitting the scan data to the e-mail address of the user. When the shortcut icon 152 is operated, the scan data is created and transmitted to the e-mail address of the user. The shortcut icon 152

"Scan to FTP" is an icon that corresponds to the shortcut information for transmitting the scan data to the FTP server 56. When the shortcut icon 152 is operated, the scan data is created and transmitted to the FTP server 56. In this MFP 10 as thus described, when one of the buttons displayed on the shortcut creation screen 160 is selected, the shortcut information can be automatically registered for each of all the user names belonging to the department set on the group setting screen 130.

Figure 8:
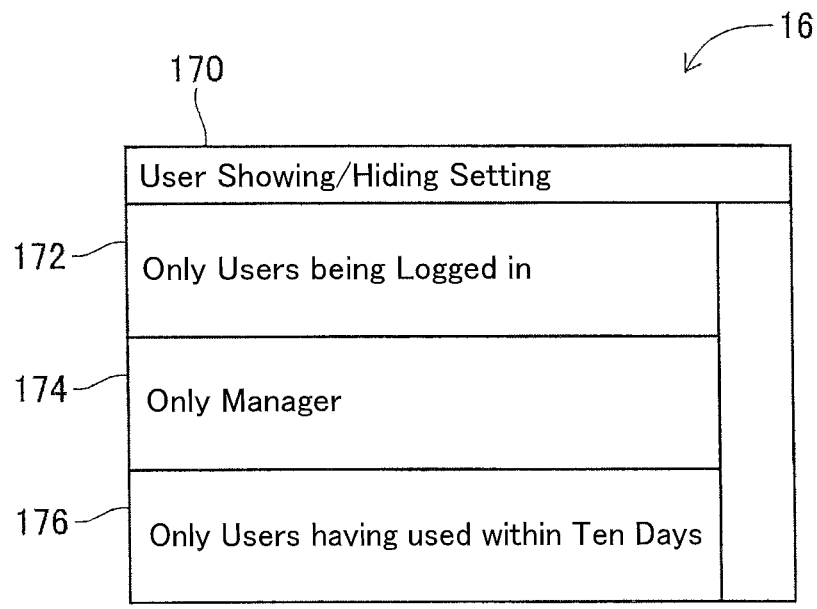
FIG. 8 is a view of a hiding setting screen.

Also, in this MFP 10, when the shortcut screen 156 is displayed based on the group list, the display 16 can display the shortcut screen 156 containing all the PC user names contained in the extracted device information, i.e., only one or some of all the user names belonging to the department set on the group setting screen 130. Specifically, when the third setting button 126 is operated on the setting screen 120, the display 16 displays a showing/hiding setting screen 170 illustrated in FIG. 8. The showing/hiding setting screen 170 contains a first showing setting button 172, a second showing setting button 174, and a third showing setting button 176.

The first showing setting button 172 is a button for displaying the shortcut screen 156 containing only the user names of the users of the respective PCs 52 being in the logged-in state among all the user names belonging to the department set on the group setting screen 130. The second showing setting button 174 is a button for displaying the shortcut screen 156 containing only the user name of the user whose post is a manager among all the user names belonging to the department set on the group setting screen 130. The third showing setting button 176 is a button for displaying the shortcut screen 156 containing only the user names of the users having used the shortcut function within ten days among all the user names belonging to the department set on the group setting screen 130.

When the first showing setting button 172 is operated on the showing/hiding setting screen 170, the MFP 10 checks the extracted device information and identifies the device information in which the login flag is OFF. The PC user names contained in the identified device information are stored as hidden user names. The user names identical to the respective hidden user names are excluded from the group list. That is, the group list contains only the user names identical to the respective PC user names contained in the device information in which the login flag is ON. Thus, the shortcut screen 156 displayed on the display 16 based on the group list contains only the user names contained in the device information in which the login flag is ON. That is, for example, the user names of the users being absent from work and not using the PCs 52 are not displayed on the shortcut screen 156, and the user names of the users using the PCs 52 at the office are displayed on the shortcut screen 156. With this configuration, only the users having a possibility of using the MFP 10 can be displayed on the shortcut screen 156, enabling the user to readily find the user name.

When the second showing setting button 174 is operated on the showing/hiding setting screen 170, the MFP 10 checks the extracted device information and identifies the device information in which the post is not a manager. The PC user names contained in the identified device information are stored as hidden user names. The user names identical to the respective hidden user names are excluded from the group list. That is, the group list contains only the user names identical to the respective PC user names contained in the device information in which the post is a manager. Thus, the shortcut screen 156 displayed on the display 16 based on the group list contains only the user names contained in the device information in which the post is a manager. This configuration results in a relatively small number of the user names displayed on the shortcut screen 156, enabling the user to readily find the user name.

When the first showing setting button 172 or the second showing setting button 174 is operated on the showing/hiding setting screen 170, as described above, the extracted device information is used to identify the user names to be excluded from the group list, i.e., the hidden user names. When the third showing setting button 176 is operated, the MFP 10 uses shortcut use information to identify the hidden user names. Specifically, each time when the shortcut function is used, the MFP 10 stores (i) the user name associated with the shortcut information on the used shortcut function in the group list, (ii) the latest date on which the shortcut function is used (hereinafter referred to as "latest use date"), and (iii) the cumulative number of usages of the shortcut function (hereinafter referred to as "shortcut-usage cumulative number"), into the data storage area 38 as the shortcut use information. When the third showing setting button 176 is operated, the latest use date associated with each of the user names contained in the group list is identified based on the shortcut use information.

The MFP 10 then determines whether the identified latest use date is within ten days after the date of the operation of the third showing setting button 176. In this processing, each user name associated with the latest use date which is not within ten days after the date of the operation of the third showing setting button 176 is stored as the hidden user name. The user names identical to the respective hidden user names are excluded from the group list. That is, the group list contains only the user names of the users each having used the shortcut function within ten days. Thus, only the user names of the users each having used the shortcut function within ten days are displayed on the shortcut screen 156 that is displayed on the display 16 based on the group list. As a result, the shortcut screen 156 contains only the user names of the users each having used the shortcut function recently, enabling the user to readily find the user name.

Figure 9:
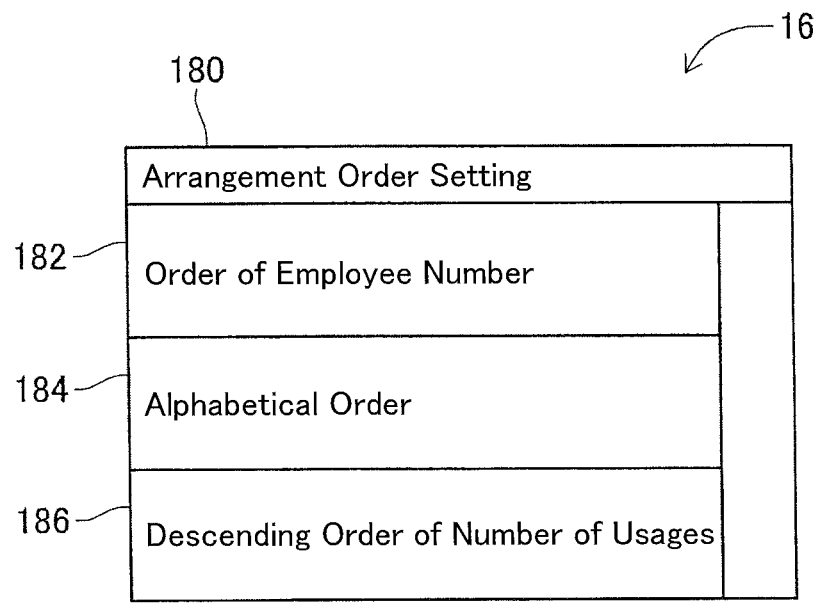
FIG. 9 is a view of an arrangement-order setting screen.

This MFP 10 allows the users to change the display order of the user names on the shortcut screen 156 displayed based on the group list. Specifically, when the fourth setting button 128 is operated on the setting screen 120, the display 16 displays an arrangement-order setting screen 180 illustrated in FIG. 9. The arrangement-order setting screen 180 contains a first arrangement-order setting button 182, a second arrangement-order setting button 184, and a third arrangement-order setting button 186. The first arrangement-order setting button 182 is for changing the display order of the user names contained in the group list, to the order of the employee number. The second arrangement-order setting button 184 is for changing the display order of the user names contained in the group list, to the alphabetical order. The third arrangement-order setting button 186 is for changing the display order of the user names contained in the group list, to the descending order of the number of usages of the shortcut function.

When the first arrangement-order setting button 182 is operated on the arrangement-order setting screen 180, the employee numbers are identified from the extracted device information, and the identified employee numbers are stored into the data storage area 38 as arrangement order information. The user names contained in the group list are then registered into the group list in a state in which the user names are sorted and arranged in the ascending order of the employee number based on the stored arrangement order information. Thus, the user names appear in the ascending order of the employee number on the shortcut screen 156 displayed on the display 16 based on the group list, making it possible for the user to readily find the user name.

When the second arrangement-order setting button 184 is operated on the arrangement-order setting screen 180, information about sorting of the user names in the alphabetical order is stored into the data storage area 38 as the arrangement order information. The user names contained in the group list are then registered into the group list in a state in which the user names are sorted and arranged in the alphabetical order based on the stored arrangement order information. Thus, the user names appear in the alphabetical order on the shortcut screen 156 displayed on the display 16 based on the group list, making it possible for the user to readily find the user name.

When the third arrangement-order setting button 186 is operated on the arrangement-order setting screen 180, the shortcut-usage cumulative numbers associated with the respective user names contained in the group list are identified based on the shortcut use information, and the identified shortcut-usage cumulative numbers are stored into the data storage area 38 as the arrangement order information. The user names contained in the group list are then registered into the group list in a state in which the user names are sorted and arranged in the descending order of the shortcut-usage cumulative number based on the stored arrangement order information. Thus, the user names appear in the descending order of the number of usages of the shortcut function on the shortcut screen 156 displayed on the display 16 based on the group list, making it possible for the user to readily find the user name.

Control Program

The creation and display of the shortcut screen 156 are executed by repeat of execution of the control program 36 by the CPU 12. There will be explained a flow of processings executed by the CPU 12 according to the control program 36 with reference to FIGS. 10-13.

Figure 10:
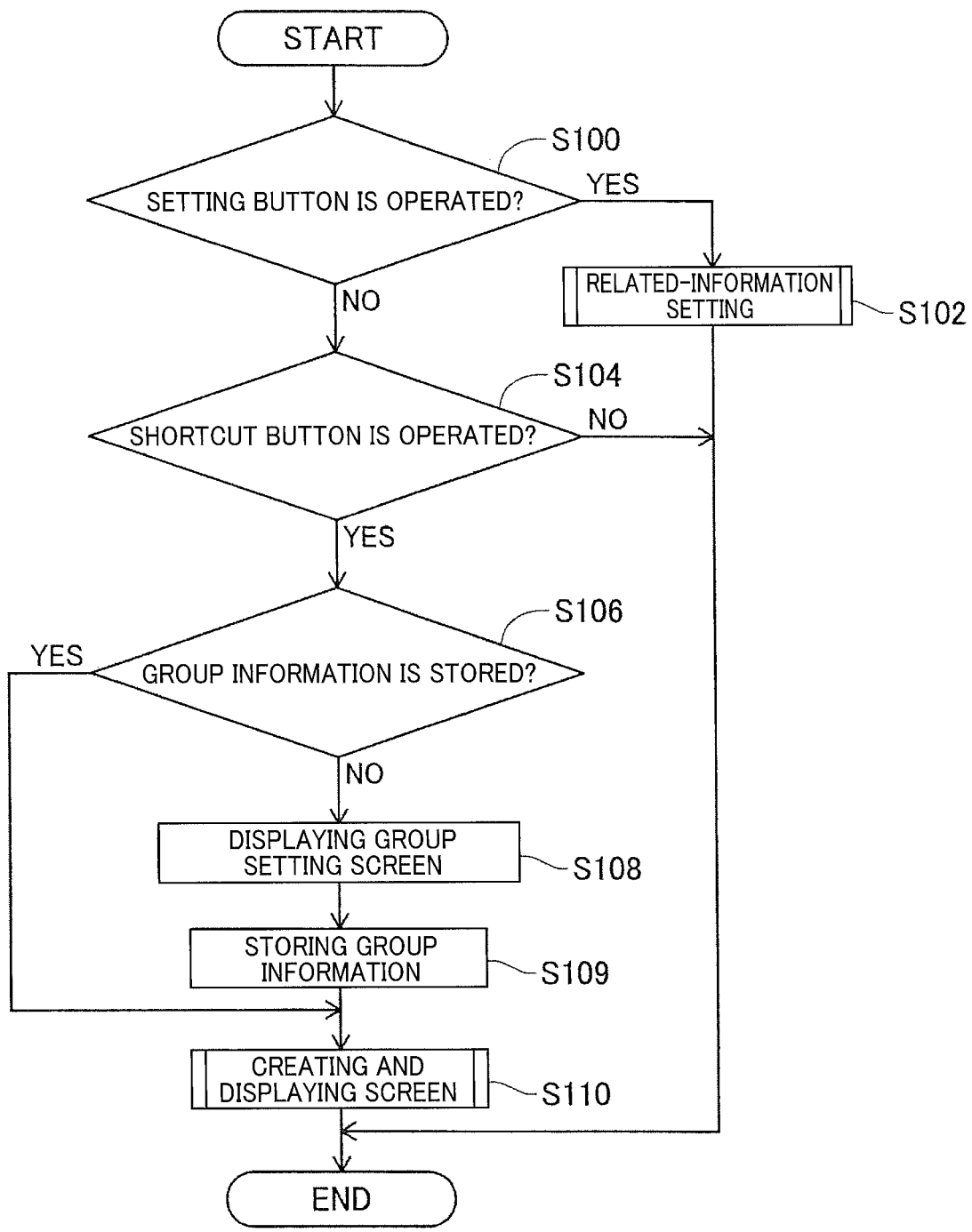
FIG. 10 is a flow chart illustrating processings executed by a multi-function peripheral (MFP)
Figure 11:
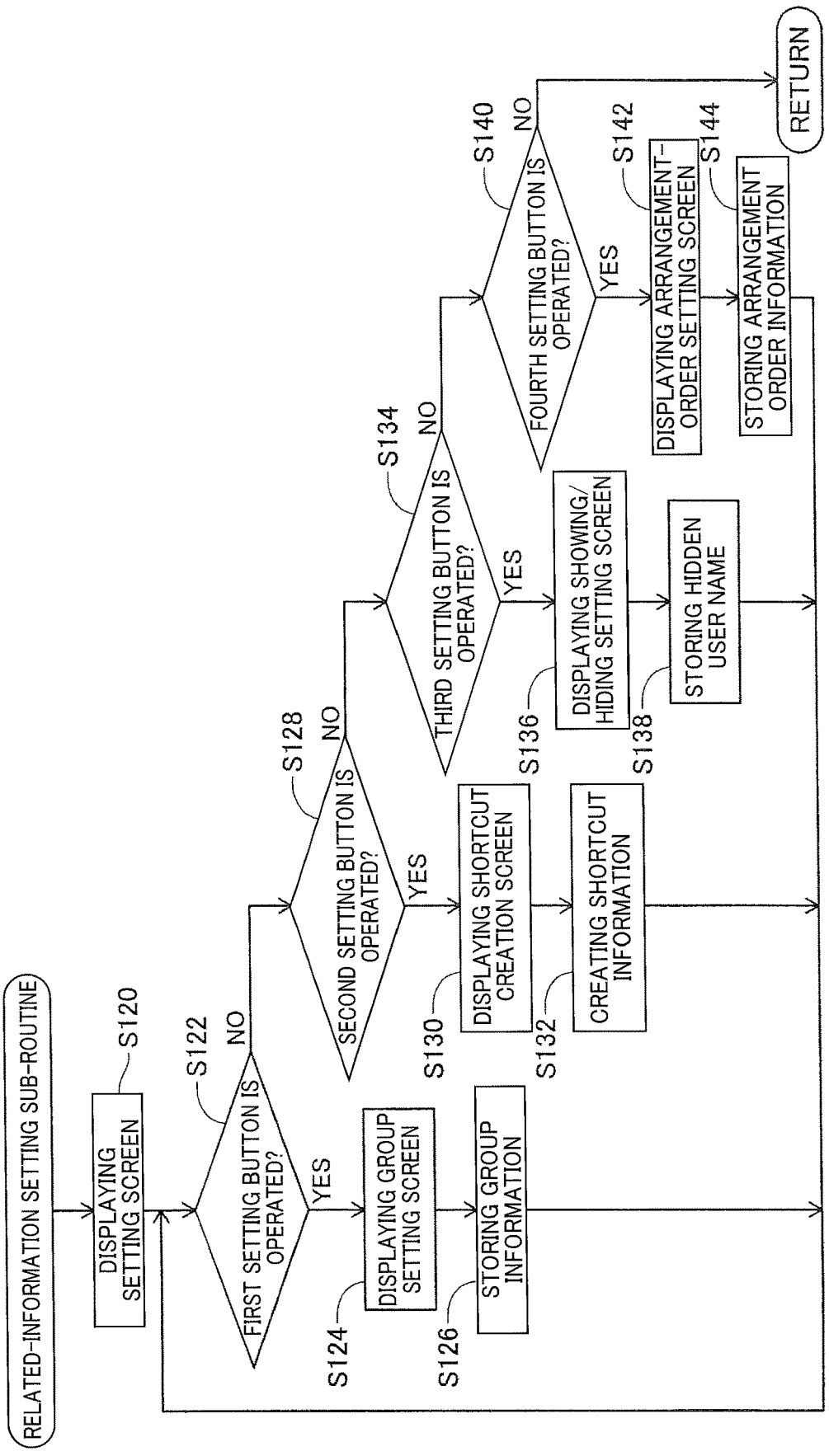
FIG. 11 is a flow chart illustrating processings executed by the MFP.

In this MFP 10, when the main screen 100 is displayed on the display 16, as illustrated in FIG. 10, the CPU 12 at S100 determines whether the setting button 108 is operated. When the setting button 108 is operated (S100: YES), the CPU 12 executes a related-information setting sub-routine at S102. In the related-information setting sub-routine, as illustrated in FIG. 3, the CPU 12 at S120 displays the setting screen 120 on the display 16. The CPU 12 at S122 determines whether the first setting button 122 is operated.

When the first setting button 122 is operated (S122: YES), the CPU 12 at S124 displays the group setting screen 130 on the display 16. When any of the selection buttons is operated on the group setting screen 130, the CPU 12 at S126 stores the department corresponding to the operated selection button into the data storage area 38 as the group information, and this flow returns to S122.

When the CPU 12 at S122 determines that the first setting button 122 is not operated (S122: NO), the CPU 12 at S128 determines whether the second setting button 124 is operated. When the second setting button 124 is operated (S128: YES), the CPU 12 at S130 displays the shortcut creation screen 160 on the display 16. When any of the creation buttons is operated on the shortcut creation screen 160, the CPU 12 at S132 creates the shortcut information corresponding to the operated creation button, and this flow returns to S122.

When the CPU 12 at S128 determines that the second setting button 124 is not operated (S128: NO), the CPU 12 at S134 determines whether the third setting button 126 is operated. When the third setting button 126 is operated (S134: YES), the CPU 12 at S136 displays the showing/hiding setting screen 170 on the display 16. When any of the showing setting buttons is operated on the showing/hiding setting screen 170, the CPU 12 at S138 stores the hidden user names corresponding to the operated showing setting button into the data storage area 38, and this flow returns to S122.

When the CPU 12 determines at S134 that the third setting button 126 is not operated (S134: NO), the CPU 12 at S140 determines whether the fourth setting button 128 is operated. When the fourth setting button 128 is operated (S140: YES), the CPU 12 at S142 displays the arrangement-order setting screen 180 on the display 16. When any of the arrangement-order setting buttons is operated on the arrangement-order setting screen 180, the CPU 12 at S144 stores the arrangement order information corresponding to the operated arrangement-order setting button into the data storage area 38, and this flow returns to S122.

When the CPU 12 at S140 determines that the fourth setting button 128 is not operated (S140: NO), the related-information setting sub-routine ends. When the related-information setting sub-routine ends, as illustrated in FIG. 10, the flow in FIG. 10 ends.

When the CPU 12 at S100 determines that the setting button 108 is not operated (S100: NO), the CPU 12 at S104 determines whether the shortcut button 110 is operated. When the shortcut button 110 is not operated (S104: NO), this flow ends. When the shortcut button 110 is operated (S104: YES), the CPU 12 at S106 determines whether the group information is stored in the data storage area 38.

When the group information is not stored in the data storage area 38 (S106: NO), the CPU 12 at S108 displays the group setting screen 130 on the display 16. When any of the selection buttons on the group setting screen 130 is selected, the CPU 12 at S109 stores the department corresponding to the operated selection button into the data storage area 38 as the group information, and this flow goes to S110. When the group information is stored in the data storage area 38 (S106: YES), this flow goes to S110. The CPU 12 at S110 executes a screen creation/display sub-routine.

Figure 12:
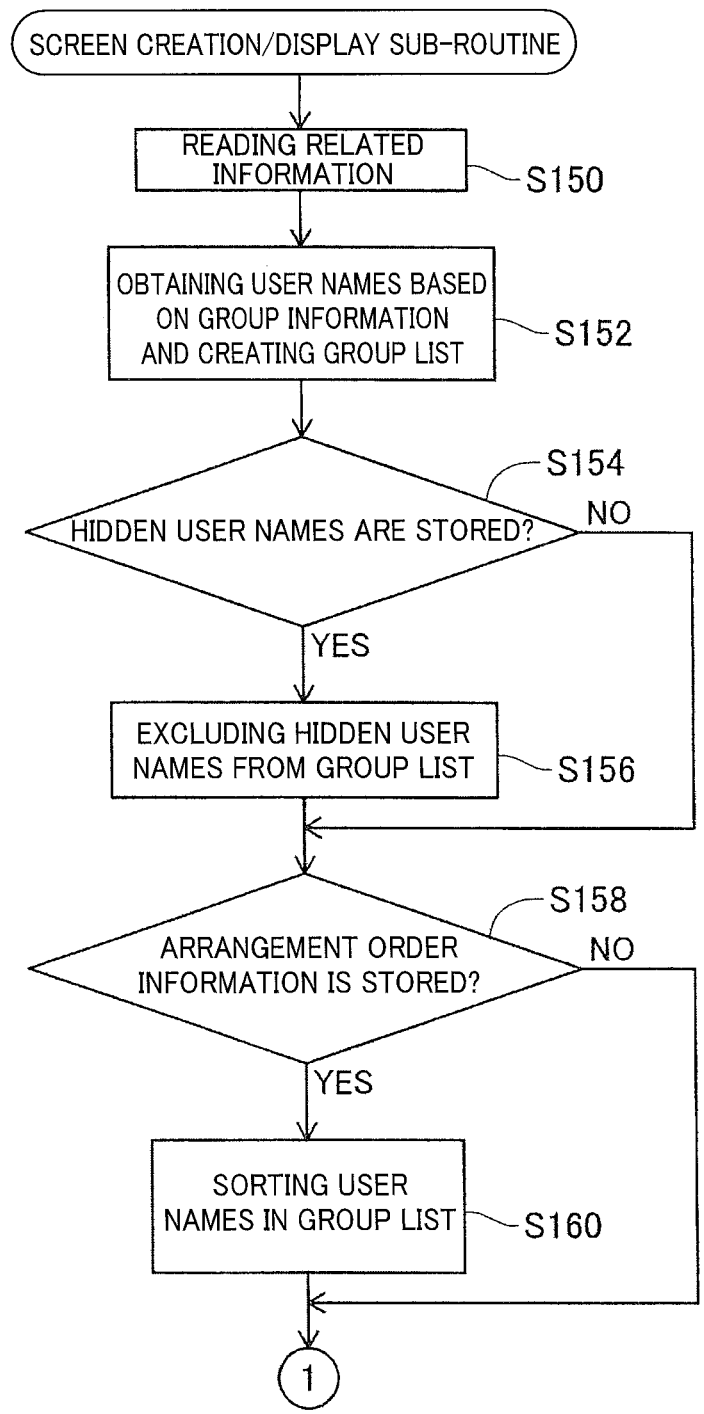
FIG. 12 is a flow chart illustrating processings executed by the MFP.

In the screen creation/display sub-routine, as illustrated in FIG. 12, the CPU 12 reads related information at S150. The related information includes: the group information stored at S109 or S126 in the related-information setting sub-routine; the shortcut information created at S132 in the related-information setting sub-routine; the hidden user names stored at S138 in the related-information setting sub-routine; and the arrangement order information stored at S144 in the related-information setting sub-routine. The CPU 12 at S152 receives all the device information from the AD server 50 and extracts the extracted device information from all the device information based on the group information. The CPU 12 creates the group list based on the extracted device information.

The CPU 12 at S154 determines whether the hidden user name or names are stored in the data storage area 38. When the hidden user name or names are stored in the data storage area 38 (S154: YES), the CPU 12 at S156 excludes the hidden user names from the group list created at S152, and this flow goes to S158. When the hidden user name or names are not stored in the data storage area 38 (S154: NO), this flow goes to S158.

The CPU 12 at S158 determines whether the arrangement order information is stored in the data storage area 38. When the arrangement order information is stored in the data storage area 38 (S158: YES), the CPU 12 at S160 sorts the user names contained in the group list created at S152, according to the arrangement order information, and this flow goes to S162. When the arrangement order information is not stored in the data storage area 38 (S158: NO), this flow goes to S162.

Figure 13:
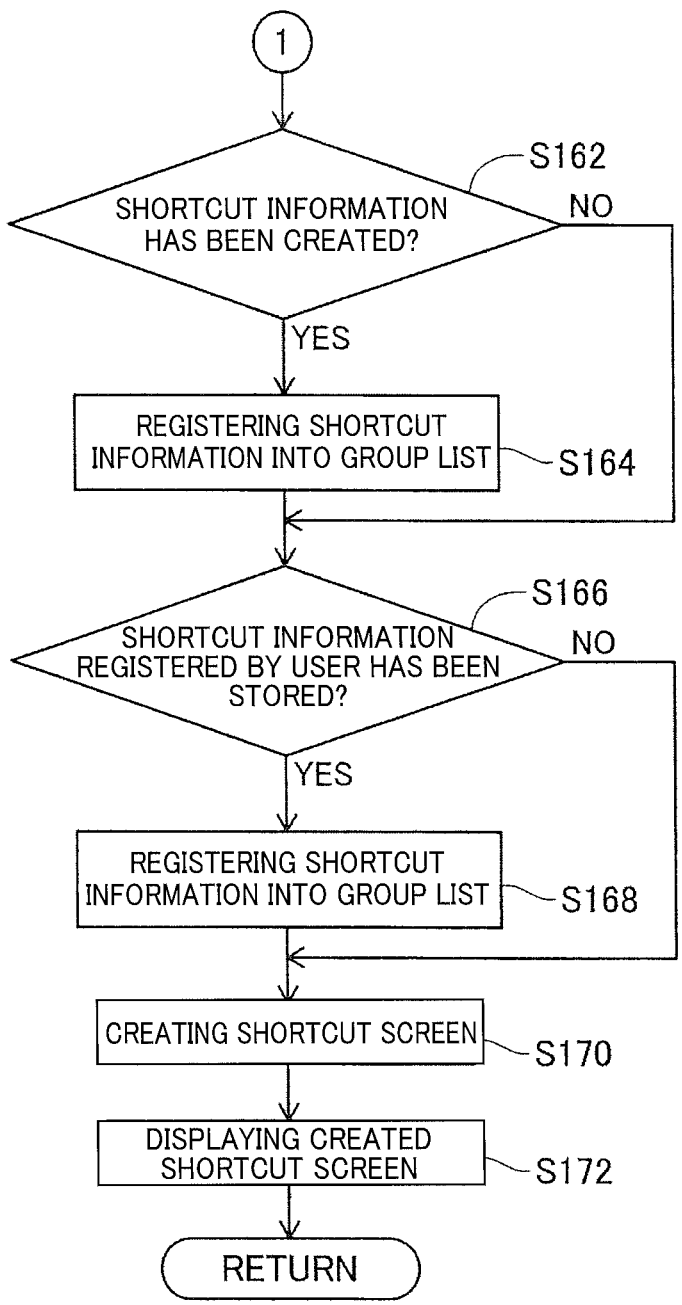
FIG. 13 is a flow chart illustrating processings executed by the MFP.

As illustrated in FIG. 13, when any of the creation buttons is operated on the shortcut creation screen 160, the CPU 12 at S162 determines whether the shortcut information has been created. When the shortcut information has been created (S162: YES), the CPU 12 at S164 registers the created shortcut information into the group list created at S152, and this flow goes to S166. When the shortcut information has been created (S162: NO), this flow goes to S166.

The CPU 12 at S166 determines whether the shortcut or shortcuts registered by the user is stored in the data storage area 38. That is, the CPU 12 determines whether the data storage area 38 stores the shortcut information different from the shortcuts created in response to the operation of any of the creation buttons on the shortcut creation screen 160. When the shortcut information registered by the user is stored (S166: YES), the CPU 12 at S168 registers the shortcut information registered by the user, into the group list created at S152, and this flow goes to S170. When the shortcut information registered by the user is not stored (S166: NO), this flow goes to S170.

The CPU 12 at S170 creates the shortcut screen 156 based on the group list. The CPU 12 at S172 displays the created shortcut screen 156 on the display 16, and this flow ends.

In view of the above, the processing at S152 is one example of a first receiving processing. The processing at S168 is one example of a second receiving processing and an extracting processing. The processing at S172 is one example of a first display processing and a second display processing.

While the embodiment has been described above, it is to be understood that the disclosure is not limited to the details of the illustrated embodiment, but may be embodied with various changes and modifications, which may occur to those skilled in the art, without departing from the spirit and scope of the disclosure. Specifically, in the above-described embodiment, the MFP 10 receives all the device information stored in the AD server 50 and extracts the device information containing the department indicated by the group information, from the received device information. However, the MFP 10 may receive only the device information containing the department indicated by the group information among all the device information stored in the AD server 50.

In the above-described embodiment, when any of the creation buttons is operated on the shortcut creation screen 160, the shortcut information for transmitting the scan data to any of the e-mail address of the user, the e-mail address of the superior, and the FTP server 56 is automatically created. However, various kinds of shortcut information may be automatically created using the device information. Specifically, for example, in the case where the device information contains information relating to a mailing list (such as user names of users registered in the mailing list and e-mail addresses of the users registered in the mailing list), the MFP 10 may display the shortcut creation screen 160 containing a creation button provided for shortcut information for transmitting the scan data to the e-mail addresses of all the users registered in the mailing list and create the shortcut information when the creation button is operated. Also, the MFP 10 may display the shortcut creation screen 160 containing a creation button provided for shortcut information for execution of the copy processing for the number of copies which corresponds to the number of the PC user names contained in the extracted device information and create the shortcut information when the creation button is operated. Furthermore, the MFP 10 may automatically create shortcut information for a processing with a high frequency of usages without using the device information. Specifically, for example, the MFP 10 may display the shortcut creation screen 160 containing a creation button provided for shortcut information for executing a both-side black-and-white copy processing for ten copies and display the shortcut information when the creation button is operated.

In the above-described embodiment, the user names to be displayed on the shortcut screen 156 when any of the showing setting buttons is operated on the showing/hiding setting screen 170 are limited to: the user names of the users of the PCs 52 each being in the logged-in state; the user name of the user whose post is a manager; and the user names of the users who have used the shortcut function within ten days. However, the user names to be displayed on the shortcut screen 156 when any of the showing setting buttons is operated on the showing/hiding setting screen 170 may be limited to the user names of the users identified by various conditions. Specifically, for example, in the case where the device information contains information relating to a project team which is different from the department (such as user names of members of the project team), the MFP 10 may display the showing/hiding setting screen 170 containing a showing setting button for limiting the user names to be displayed on the shortcut screen 156, to the user names of the members of the project team and display only the user names of the members of the project team on the shortcut screen 156 when the showing setting button is operated. Also, for example, in the case where the shortcut use information stores the date and time of use of the shortcut function over a predetermined period, the MFP 10 may display the showing/hiding setting screen 170 containing a showing setting button for limiting the user names to be displayed on the shortcut screen 156, to the user names of the users having used the shortcut function within the predetermined period during the time period in which the button operation is performed and display only the user names of the users who have used the shortcut function within the predetermined period. Also, for example, in the case where the shortcut use information stores a day of use of the shortcut function over a predetermined period, the MFP 10 may display the showing/hiding setting screen 170 containing a showing setting button for limiting the user names to be displayed on the shortcut screen 156, to the user names of the users having used the shortcut function within the predetermined period during the day on which the button operation is performed and display only the user names of the users who have used the shortcut function within the predetermined period. Also, for example, the MFP 10 may display the showing/hiding setting screen 170 containing a showing setting button for limiting the user names to be displayed on the shortcut screen 156, to the user names of the users who have registered the shortcut information instead of the automatic registration of the shortcut information by the operation of the creation button on the shortcut creation screen 160 and display only the user names of the users having registered the shortcut information on the shortcut screen 156 when the showing setting button is operated.

In the above-described embodiment, when any of the arrangement-order setting buttons is operated on the arrangement-order setting screen 180, the user names to be displayed on the shortcut screen 156 are sorted in any of the order of the employee number, the alphabetical order, and the shortcut-usage cumulative number, but the user names may be sorted according to various conditions. Specifically, for example, the MFP 10 may display the arrangement-order setting screen 180 containing an arrangement-order setting button for sorting the user names to be displayed on the shortcut screen 156 in the descending order of post and display the user names on the shortcut screen 156 in a state in which the user names are arranged in the descending order of post when the arrangement-order setting button is operated. Also, for example, the MFP 10 may display the arrangement-order setting screen 180 containing an arrangement-order setting button for sorting the user names to be displayed on the shortcut screen 156 in the descending order of the number of the shortcut information registered in the group list and display the user names on the shortcut screen 156 in a state in which the user names are arranged in the descending order of the number of the shortcut information, i.e., the number of the shortcut icons 152 when the arrangement-order setting button is operated.

While the shortcut-registered user name and the shortcut information are stored in the data storage area 38 in the state in which the shortcut-registered user name and the shortcut information are associated with each other in the above-described embodiment, the shortcut-registered user name and the shortcut information may be stored in an external device such as the FTP server 56 in the state in which the shortcut-registered user name and the shortcut information are associated with each other. In this case, the MFP 10 receives the shortcut-registered user name and the shortcut information from the external device.

While the processings illustrated in FIGS. 10-13 are executed by the CPU 12 in the above-described embodiment, other devices may execute these processings. For example, these processings may be executed by an ASIC or other logical integrated circuits and may be executed by cooperation of the CPU, the ASIC, and other the logical integrated circuits, for example.

What is claimed is:

1. A processing executing apparatus, comprising:
    a display;
    a storage;
    a communication device communicable with a server; and
    a controller configured to:
        store, into the storage, first group identification information for identifying a first group of a plurality of groups, the first group being selected based on an input to the processing executing apparatus;
        store, into the storage, shortcut information containing first shortcut information, second shortcut information and third shortcut information, the first shortcut information indicating an association between a first shortcut function and a first user, the second shortcut information indicating associations between a second shortcut function and each of the first user and a second user, the third shortcut information indicating associations between a third shortcut function and each of the second user and a third user;
        receive, from the server, device information for each of a plurality of users, the device information containing user information and group belonging information, the user information identifying one of the plurality of users, the group belonging information identifying one of the plurality of groups to which the user identified by the user information belongs;
        extract, based on the group belonging information corresponding to the first group stored in the storage, first-user information and second-user information, from the device information the first-user information comprising first-user identifying information for identifying the first user of the plurality of users and group belonging information for identifying the first group to which the first user belongs, the second-user information comprising second-user identifying information for identifying the second user of the plurality of users and group belonging information for identifying the first group to which the second user belongs;
        create a first-group list containing (i) the first user identified by the first-user identification information, (ii) the first shortcut function and the second shortcut function associating with the first user, (iii) the second user identified by the second-user identification and (iv) the second shortcut function and the third shortcut function associating with the second user, the first-group list not containing the third user;
        when the first user is selected, control the display to display, based on the created first-group list, (i) users, belonging to the first group, at least containing the first user, (ii) a first operation button corresponding to the first shortcut function and (iii) a second operation button corresponding to the second shortcut function without displaying the third user; and
        when the second user is selected, control the display to display, based on the created first-group list, (i) the users, belonging to the first group, containing at least the second user, (ii) the second operation button and (iii) a third operation button corresponding to the third shortcut function without displaying the third user,
        wherein when a shortcut function is created for a user, the controller is configured to automatically create the shortcut function for each of the users belonging to the same group as the user.

2. The processing executing apparatus according to claim 1, wherein the controller is configured to transmit data to a destination via the communication device, wherein the first user information further comprises first destination information indicating a first destination to which data is to be transmitted for the first user identified by the first user information, and wherein the controller is configured to control the display to display, for the first user, an operation button as the first operation button for instructing execution of data transmitting to the first destination indicated by the first destination information.

3. The processing executing apparatus according to claim 1, wherein the controller is configured to transmit data to a destination via the communication device, wherein the first user information comprises second destination information indicating a second destination to which data is to be transmitted for a related user having a relation with the first user identified by the first user information, and wherein the controller is configured to control the display to display, for the first user, an operation button as the first operation button for instructing execution of data transmitting to the second destination indicated by the second destination information.

4. A non-transitory storage medium storing a plurality of instructions readable by a computer of a processing executing apparatus, the processing executing apparatus comprising:
    a display;
    a storage; and
    a communication device communicable with a server, the plurality of instructions, when executed by the computer, causing the processing executing apparatus to execute:
  store, into the storage, first group identification information for identifying a first group of a plurality of groups, the first group being identified based on an input to the processing executing apparatus;
  store, into the storage, shortcut information containing first shortcut information, second shortcut information and third shortcut information the first shortcut information indicating an association between a first shortcut function and a first user, the second shortcut information indicating associations between a second shortcut function and each of the first user and a second user, the third shortcut information indicating associations between a third shortcut function and each of the second user and a third user;
  receive, from the server, device information for each of a plurality of users, the device information containing user information and group belonging information, the user information identifying one of the plurality of users, the group belonging information identifying one of the plurality of groups to which the user identified by the user information belongs;
  extract, based on the group belonging information corresponding to the first group stored in the storage, first-user information and second user information, from the device information, the first-user information comprising first-user identifying information for identifying the first user of the plurality of users and group belonging information for identifying the first group to which the first user belongs, the second-user information comprising second-user identifying information for identifying the second user of the plurality of users and group belonging information for identifying the first group to which the second user belongs;
  create a first-group list containing (i) the first user identified by the first-user identification information, (ii) the first shortcut function and the second shortcut function associating with the first user, (iii) the second user identified by the second-user identification information and (iv) the second shortcut function and the third shortcut function associating with the second user, the first-group list not containing the third user;
  when the first user is selected, control the display to display, based on the created first-group list, (i) users, belonging to the first group, at least containing the first user, (ii) a first operation button corresponding to the first shortcut function and (iii) a second operation button corresponding to the second shortcut function without displaying the third user; and
  when the second user is selected, control the display to display, based on the created first-group list, (i) the users, belonging to the first group, containing at least the second user, (ii) the second operation button and (iii) a third operation button corresponding to the third shortcut function without displaying the third user,
  wherein when a shortcut function is created for a user, the plurality of instructions, when executed by the computer, further cause the processing executing apparatus to automatically create the shortcut function for each of the users belonging to the same group as the user.

* * * * *

UNITED STATES PATENT AND TRADEMARK OFFICE
CERTIFICATE OF CORRECTION

PATENT NO. : 10,761,677 B2
APPLICATION NO. : 15/434388
DATED : September 1, 2020
INVENTOR(S) : Takatoshi Ono Page 1 of 1

It is certified that error appears in the above-identified patent and that said Letters Patent is hereby corrected as shown below:

Column 16, Claim 1, Line 2 should read:
from the device information, the first-user information Column 17, Claim 14, Line 10 should read:
and third shortcut information, the first shortcut Signed and Sealed this
Second Day of February, 2021

Drew Hirshfeld
*Performing the Functions and Duties of the*
*Under Secretary of Commerce for Intellectual Property and*
*Director of the United States Patent and Trademark Office*